United States Patent [19]
Nozawa

[11] Patent Number: 4,518,071
[45] Date of Patent: May 21, 1985

[54] CLUTCH DISC HAVING DAMPER SPRINGS

[75] Inventor: Koji Nozawa, Higashikurume, Japan

[73] Assignee: Nissan Motor Co., Ltd., Yokohama, Japan

[21] Appl. No.: 448,072

[22] Filed: Dec. 9, 1982

[30] Foreign Application Priority Data

Feb. 16, 1982 [JP] Japan .................. 57-23343

[51] Int. Cl.³ .............................. F16D 3/66
[52] U.S. Cl. ................. 192/106.2; 464/64; 464/67; 464/68
[58] Field of Search ............... 192/70.17, 106.1, 106.2; 464/62, 64, 66, 67, 68

[56] References Cited

U.S. PATENT DOCUMENTS

| | | | |
|---|---|---|---|
| 767,825 | 8/1904 | McIntyre | 464/67 |
| 1,334,537 | 3/1920 | Hupp | 464/67 |
| 1,889,698 | 11/1932 | Reed . | |
| 2,028,951 | 1/1936 | Reed . | |
| 2,826,901 | 3/1958 | Barrenechea | 464/68 |
| 2,984,091 | 5/1961 | Ludwig | 464/68 |
| 3,068,979 | 12/1962 | Duntov | 192/70.17 |
| 3,556,273 | 1/1971 | Maucher | 464/64 |
| 3,628,353 | 12/1971 | Armstrong | 192/106.1 |
| 4,144,959 | 3/1979 | Maucher et al. . | |
| 4,279,132 | 7/1981 | Lamarche | 192/106.2 |

FOREIGN PATENT DOCUMENTS

| | | |
|---|---|---|
| 1346144 | 11/1963 | France . |
| 1396803 | 5/1964 | France . |
| 1469858 | 1/1967 | France . |
| 2343163 | 9/1977 | France . |
| 1216547 | 12/1970 | United Kingdom . |

Primary Examiner—Allan D. Herrmann
Attorney, Agent, or Firm—Lane, Aitken & Kananen

[57] ABSTRACT

A clutch disc has at least two kinds of torsion damper springs arranged circumferentially around a hub of the clutch disc. First damper springs have a spring constant smaller than that of second damper springs. The first springs and the second springs are not arranged in series, end to end, in a circle, but the first springs are arranged in parallel with the second springs. The first springs are wound around an annular wire guide concentric with the hub. In one embodiment, the annular wire guide extends through the second springs, and the first springs are inserted in the second springs, respectively. In another embodiment, the annular wire guide is mounted on the outer periphery of a flange of the hub outside the second springs.

4 Claims, 9 Drawing Figures

4,518,071

CLUTCH DISC HAVING DAMPER SPRINGS

BACKGROUND OF THE INVENTION

The present invention relates to clutch discs of friction type clutches.

A clutch of an automobile disconnects and reconnects the engine from the transmission and the drive line. A clutch disc of a friction type clutch is provided with a damper mechanism for isolating the vibration caused by variation in engine output torque from the transmission. That is, damper springs are mounted circumferentially around a flange of a spline hub and compressed circumferentially between the hub flange and an assembly of a clutch plate and a retaining plate. These damper springs do not have the same spring characteristic, but they are classified into groups having different spring characteristics, such that the overall spring characteristic changes in a sequence of stages in accordance with the relative angular displacement occurring between the hub flange and the clutch plate assembly. A maximum relative rotational angle within which the hub flange and the clutch plate are allowed to relatively displace is made as large as possible in order to obtain a good damper effect.

In a conventional design of such a torsion damper mechanism, the damper springs have approximately the same diameter, and are placed in series on the same circle. This arrangement limits the space for accommodating the damper springs, and limits, also, the relative rotational angle between the hub flange and the clutch plate assembly to under about 11 degrees. In order to increase the relative rotational angle beyond this limit, it is necessary to form, in the hub flange, large openings for accommodating the damper springs, but such a large opening size weakens the hub flange and causes excessive stress in the damper springs. Because of this 11-degree limit, a clutch disc of the conventional type can not sufficiently absorb torque fluctuation. This torque fluctuation produces gear noise due to backlash in the transmission, especially at low rotational speed and at idling.

SUMMARY OF THE INVENTION

It is an object of the present invention to provide a clutch disc having an arrangement of torsion damper springs which allows a large relative rotational displacement between a hub and an assembly of a clutch plate and a retaining plate.

According to the present invention, a clutch disc comprises an assembly of a clutch plate having clutch friction facings and a retaining plate, a spline hub having a flange disposed between the clutch plate and the retaining plate, and damper means arranged between the assembly and the flange of the hub for transmitting torque therebetween. The damper means comprises first damper means and second damper means. The first damper means comprises a plurality of first damper coil springs which are arranged circumferentially around the hub and wound around annular wire guide concentric with the hub. One end of each of the first damper springs is seated on the assembly, and the other end on the hub flange in such a manner that each of said first springs is compressed in accordance with a relative rotational displacement between the assembly and the hub flange. The second damper means comprises a plurality of second damper springs having a spring constant greater than that of the first damper springs. Each of the second springs is contained in each of a plurality of pockets arranged circumferentially around the hub. Each of the pockets is formed by three openings which are formed, respectively, in the clutch plate, the hub flange, and the retaining plate in such a manner that the second springs begin to be compressed when a relative rotational displacement between the hub flange and the assembly exceeds a predetermined angle.

DETAILED DESCRIPTION OF THE INVENTION

Figure 1:
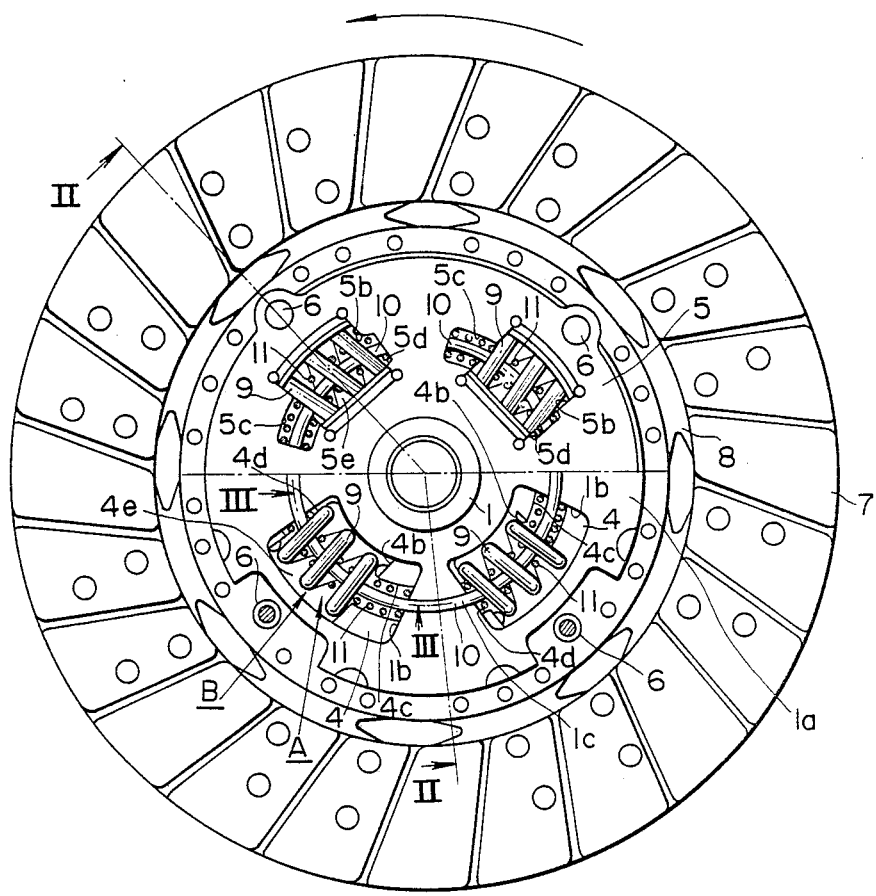
FIG. 1 is a front, partly broken, view showing one embodiment of the present invention.
Figure 2:
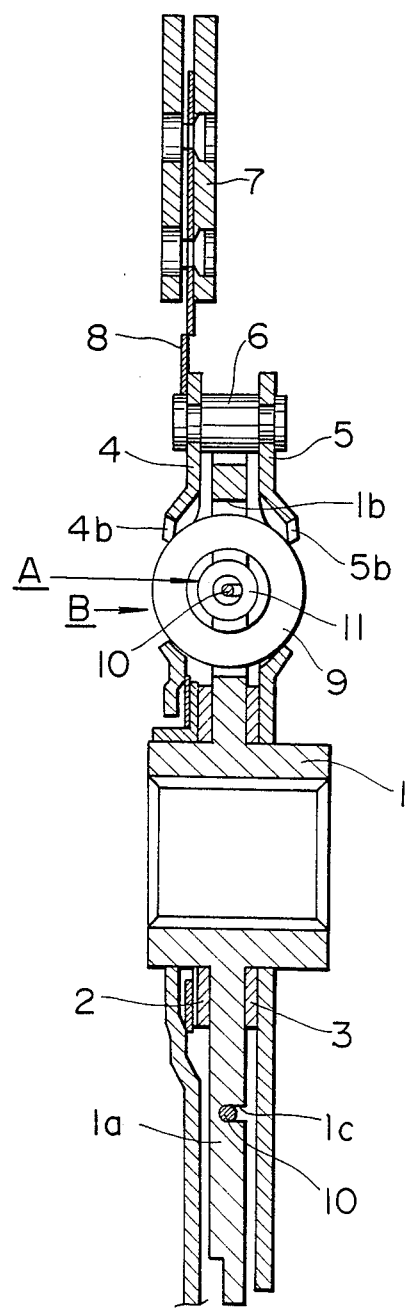
FIG. 2 is a sectional view taken along a line II—II of FIG. 1.
Figure 3:
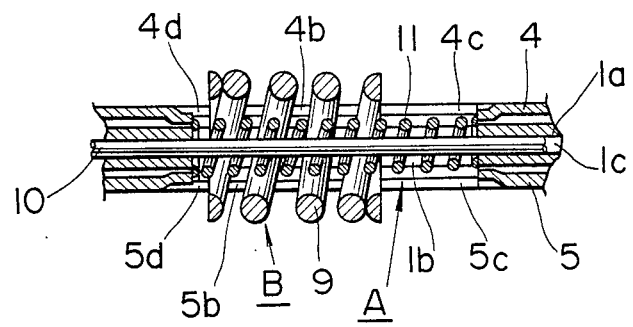
FIG. 3 is a sectional view taken along a line III—III of FIG. 1.

One embodiment of the present invention is shown in FIGS. 1 to 4. A spline hub 1 having internal splines is integrally formed with an outward flange 1a. On each side of the flange 1a, a clutch plate 4 and a retaining plate 5 are mounted through friction washers 2, 3, respectively. The clutch plate 4 and the retaining plate 5 are connected by rivet pins 6. Cushioning plates 8 having clutch friction facings 7 are fitted to the outer periphery of the clutch plate 4.

Openings, 1b, 4b and 5b are formed, respectively, in the hub flange 1a, the clutch plate 4 and the retaining plate 5. In this embodiment, there are four sets of the openings 1b, 4b and 5b, as shown in FIG. 1. These four sets of the openings are arranged on one and the same circle. Each of four springs 9 is contained in a pocket formed by each set of the openings 1b, 4b and 5b. When the hub flange 1a rotates relative to the assembly of the clutch plate 4 and the retaining plate 5 beyond a predetermined angle, the springs 9 begins to be compressed. The springs 9 are held in position by the openings 4b and 5b. The springs 9 and the openings 1b, 4b and 5b constitute a second stage damper B.

An annular groove 1c is formed circumferentially in the hub flange 1a on the retaining plate side. A circle formed by the annular groove 1c passes through the center of every spring 9 and is concentric with the spline hub 1. An annular wire guide 10 is fitted in the annular groove 1c. The annular wire guide 10 extends along the annular groove 1c and through the openings 1b, and forms the circle concentric with the spline hub 1. Each of the openings 4b of the clutch plate 4 has an enlarged middle portion 4e, and first and second elongate portions 4c, 4d which have a width narrower than the middle portion 4e. The first elongate portion 4c extends from the middle portion in the direction of the clutch disc rotation along the annular wire guide 10, and the second elongate portion 4d extends in the opposite direction from the middle portion. The first elongate portion 4c is longer than the second elongate portion 4d. Each of the openings 5b of the retaining plate 5 has an enlarged middle portion 5e, a first elongate portion 5c and a second elongate portion 5d having the same configurations as the middle portion and the first and second elongate portions of the opening 4c. The length along the circumferential direction between the end of the first elongate portion 4c and the end of the second elongate portion 4d is equal to the length of the opening 1b along the circumferential direction. The corresponding length of the opening 5b is also equal to the length of the opening 1b along the circumferential direction. In a neutral state where no torque is transmitted through the disc clutch, the angular position of the opening 1b of each pocket coincide with the openings 4b and 5b of that pocket. A coil spring 11 is contained in each set of the first and second elongate portions 4c, 4d, and the first and second elongate portions 5c, 5d. Each of the springs 11 is wound around the annular wire guide 10, passes through the inside of the spring 9 coaxially, and extends over the full length of the openings 1b, 4b and 5b from the ends of the first elongate portions of the opening 4b and 5b to the ends of the second elongate portions of the openings 4b and 5b. The springs 11 has a spring constant smaller than that of the springs 9. One end of each of the springs 11 is seated on the hub flange 1a, and the other end on the clutch plate 4 and the retaining plate 5. The coil springs 11, the annular wire guide 10, the annular groove 1c, the openings 1b, and the openings 4b and 5b with the first and second elongate portions constitute a first stage damper A which acts in the full range of the relative rotational angle between the hub flange 1a, and the clutch plate 4 and the retaining plate 5.

The operations of this clutch disc is as follows: In the state where the clutch disc is incorporated in a clutch, the spline hub 1 is constantly engaged with an input shaft of a transmission. On the other hand, the clutch plate 4 and the retaining plate 5 rotate integrally with an output shaft of an engine, by the aid of the friction between the clutch facings 7, and the pressure plate of the clutch and the flywheel fixedly connected with the output shaft of the engine, when the clutch facings 7 is pressed by the pressure plate against the flywheel.

Torque vibration transmitted during clutch engagement is absorbed by the relative rotational movements between the flange 1a of the spline hub 1 and the assembly of the clutch plate 4 and the retaining plate 5.

Figure 4:
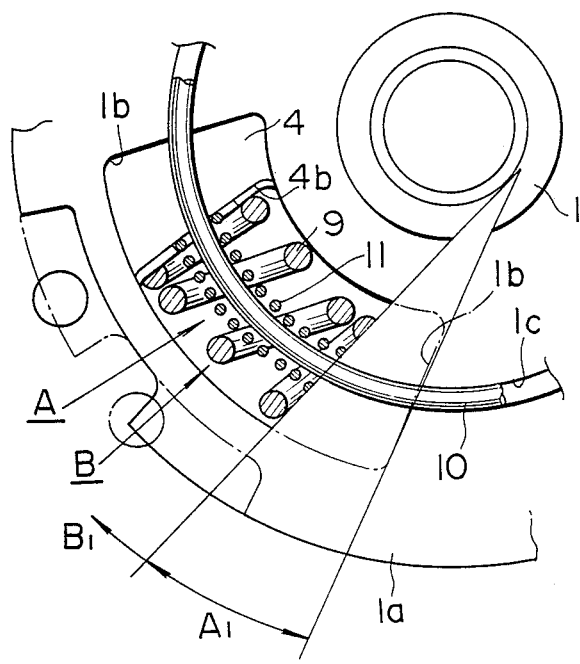
FIG. 4 is a front view showing a portion of clutch disc of FIG. 1 in a state where a relative rotational displacement takes place.

When the hub flange 1a in FIG. 1 rotates with respect to the assembly of the clutch plate 4 and the retaining plate 5 in the clockwise direction through the action of torque vibration, each of the coil springs 11 is compressed by one end of the opening 1b of the hub flange 1a. The coil spring 11 is compressed gradually and reaches the state, shown in FIG. 4, where one end of the coil spring 11 reaches one end of the spring 9. In this state, the relative angular displacement amounts to an angle A1 as shown in FIG. 4. When the relative rotational angle exceeds the angle A1 and enters a zone of an angle B1, the spring 9 begins to be compressed. In this zone, the coil spring 11 continues to be compressed along with the spring 9. After the start of the compression of the coil spring 11 and after the start of the compression of the coil spring 9 as well, the far end of the spring 11 in the counterclockwise direction in FIG. 4 is seated only on the hub flange 1a, and the other end of the spring 11 in the clockwise direction is seated on the clutch plate 4 and the retaining plate 5.

While the clutch plate 5 is being driven and torque is being transmitted, the springs 11 are always pushed in the clockwise direction in FIG. 4. With the longer length of the first elongate portions 4c and 5c, the springs 11 can deflect sufficiently in this direction. Heavy torque is transmitted through the compression of the springs 9.

The maximum relative rotational angle between the hub flange 1a and the assembly of the clutch plate and the retaining plate is made larger by increasing the size of the openings 1b of the hub flange 1a, as compared with the conventional type clutch disc. In the conventional design, the first stage damper springs are arranged in series with the second stage damper springs circumferentially around the hub. In contrast with this conventional design, the first stage springs 11 are arranged in parallel with the second stage springs 9 in the clutch disc of the present invention. With this arrangement, more space in the hub flange can be used for the openings of the springs 9, and the size of the openings can be increased.

Figure 5:
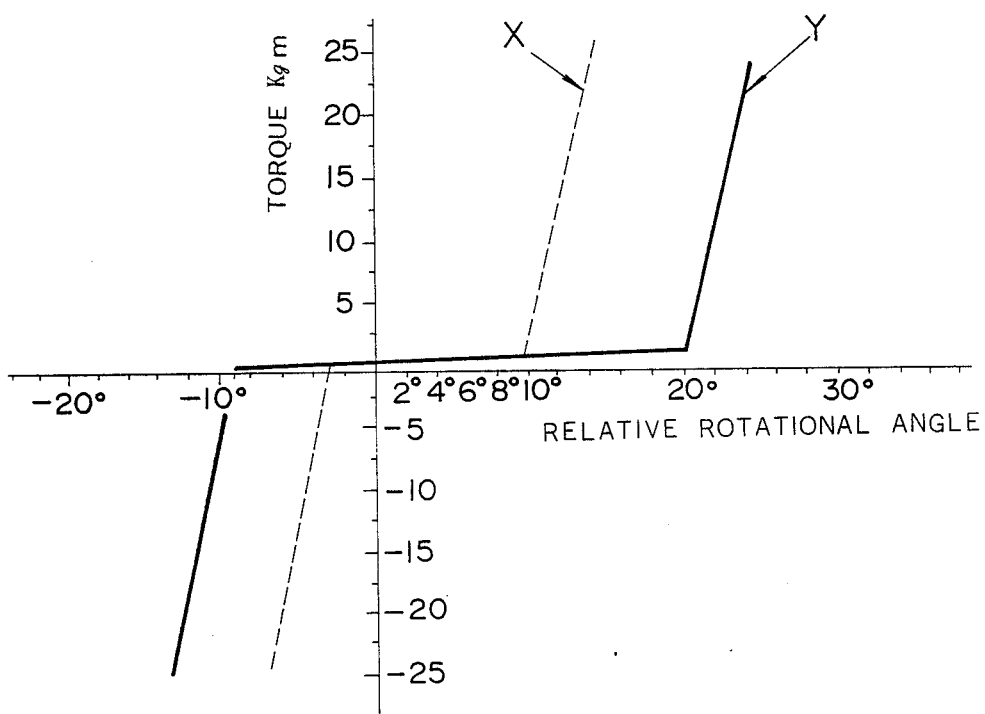
FIG. 5 is a graphical representation showing relationships between a relative rotational angle and a torque.

FIG. 5 shows relationship between the relative rotational angle and the torque. A line x is a relationship according to the conventional type clutch disc. A line Y is a relationship according to the clutch disc of the present invention. According to the present invention, the hub flange 1a can rotate more widely with respect to the assembly of the clutch plate 4 and the retaining plate 5, so that torque vibration is absorbed efficiently and the gear backlash noise in a transmission is prevented.

Another embodiment is shown in FIGS. 6 to 9. In this embodiment, the first stage damper A is arranged circumferentially on the outer peripheries of the hub flange 1a and the retaining plate 5. The hub flange 1a has a plurality of first blocks 13 formed integrally on the outer periphery. The retaining plate 5 has a plurality of second blocks 14 on the outer periphery. The second blocks 14 are fixed to the retaining plate 5 by the rivet pins. The first blocks 13 and the second blocks 14 are arranged alternately in a circle concentric with the spline hub 1. An annular wire guide 10 concentric with the spline hub 1 is supported by the alternately arranged first and second blocks 13 and 14. Either or both of the first blocks 13 and the second blocks 14 support the annular wire guide slidably. A coil spring 11 is wound around the annular wire guide between every neighbouring pair of the first block 13 and the second block 14. One end of each of the coil springs 11 is fixed to one of the first block 13, and the other end is fixed to the neighbouring second block 14. In this embodiment, the openings 4b and 5b do not have the elongate portions but have only the middle portions.

Figure 6:
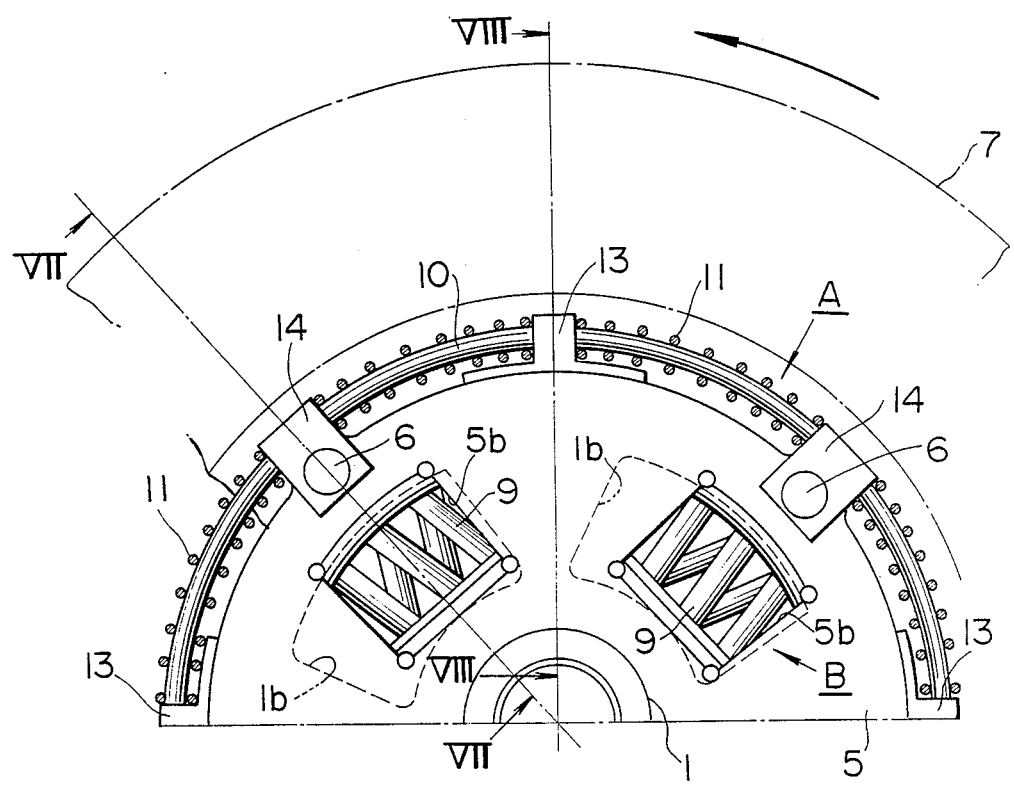
FIG. 6 is a front view of a portion of a clutch disc of another embodiment.
Figure 7:
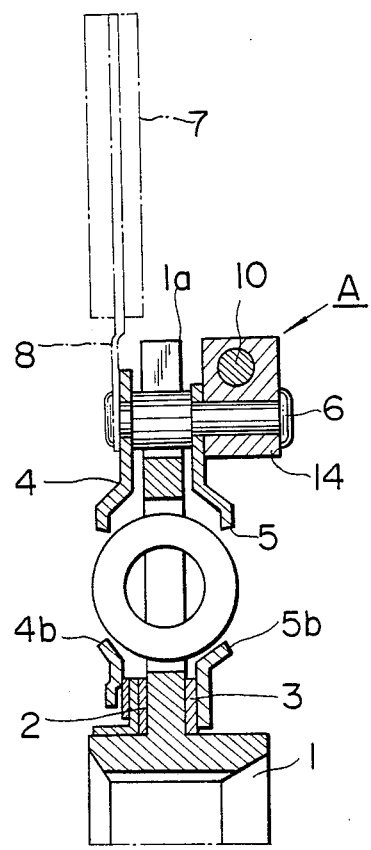
FIG. 7 is a sectional view taken along a line VII—VII of FIG. 6.
Figure 8:
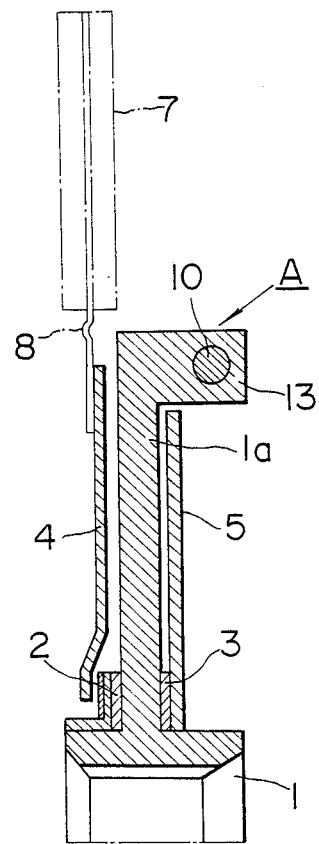
FIG. 8 is a sectional view taken along a line VIII—VIII of FIG. 6.
Figure 9:
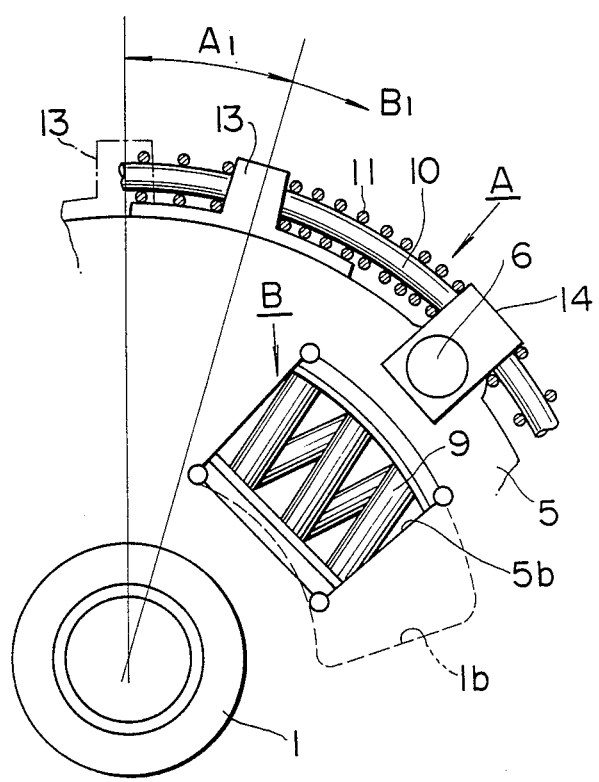
FIG. 9 is a front view of a portion of the clutch disc of FIG. 6 in a state where a relative rotational displacement takes place.

When the hub flange 1a rotates in the clockwise direction in FIG. 6, the first blocks 13 rotate together. During this, each of the first blocks 13 compresses the adjacent spring 11 on the forward side, and at the same time, pulls the adjacent spring 11 on the rearward side. The springs 11 on the forward side of the first blocks 13, that is, the springs 11 which are compressed during a forward rotation of the clutch disc, has a spring constant larger than that of the springs 11 on the rearward side of the first blocks 13. In other respects, the construction and the operations of this embodiment is the same as those of the preceding embodiment.

Thus, according to the present invention, the maximum relative rotational angle between the hub flange and the assembly of the clutch plate and the retaining plate is increased without a sacrifice of the rigidity of the hub flange, so that engine torque vibrations can be absorbed efficiently and gear backlash noises can be prevented.

What is claimed is:

1. A clutch disc comprising:
   an assembly including a clutch plate having friction facings and a retaining plate joined to said clutch plate,
   a spline hub having a flange which is disposed between said clutch plate and said retaining plate, said assembly and said flange of said hub being formed with a plurality of pockets circumferentially arranged around said hub, each of said pockets being formed by three openings formed, respectively, in said clutch plate, said flange, and said retaining plate, each of said openings of said assembly having an enlarged middle portion having circumferentially spaced first and second shoulders, a first elongate portion extending circumferentially from said middle portion in a normal direction in which said clutch disc normally rotates and terminating at a first end, and a second elongate portion extending circumferentially from said middle portion in a reverse direction opposite to the normal direction and terminating at a second end, the circumferential length of said first elongate portion being longer than that of said second elongate portion of each opening in said assembly, each of said openings in said flange having first and second ends circumferentially spaced at a distance equal to the circumferential distance between said first and second ends of said openings of said assembly,
   damper means arranged between said assembly and said flange of said hub for transmitting torque therebetween, said damper means comprising
   first damper means comprising a plurality of first damper coil springs which are arranged circumferentially around said hub and wound around an annular wire guide which is concentric with said hub and passes through all of said pockets, each of said first springs being confined between said first and second ends of said openings of said assembly in a pocket in such a manner that each of said first springs is effective over the full angular range of the relative rotational displacement between said assembly and said flange, and
   second damper means comprising a plurality of second damper coil springs having a spring constant greater than that of said first springs, each of said second springs being confined between said first and second shoulders of said openings in said assembly in one pocket in such a manner that said second springs begin to be compressed when a relative rotational displacement between said flange and said assembly exceeds a predetermined angle, each of said first springs being inserted in a respective one of said second springs with one end projecting from one end of that second spring and the other end projecting from the other end of that second spring in a neutral state where no torque is transmitted through the clutch disc.

2. A clutch disc according to claim 1, wherein said flange of said hub is formed with an annular groove which receives said annular wire guide.

3. A clutch disc comprising:
   an assembly including a clutch plate having friction facing and a retaining plate which has an inner side facing toward said clutch plate and an oppositely facing outer side and which is joined to said clutch plate by a plurality of pins which extend in parallel to an axis of said clutch disc and are arranged in a circle around the axis, said assembly having a plurality of assembly blocks each of which is fixed to the outer side of said retaining plate by one of said pins,
   a spline hub having a flange which is disposed between said clutch plate and said retaining plate, said spline hub having a plurality of flange blocks each of which extends integrally from the outer periphery of said flange in the axial direction beyond the outer periphery of said retaining plate, said assembly blocks and said flange blocks being arranged alternately in a circle around the axis,
   an annular wire guide concentric with said hub and supported by said assembly blocks and said flange blocks in such a manner that a relative rotational movement between said assembly blocks and said flange blocks is possible, said annular wire guide being located in a plane which is perpendicular to the axis of said clutch disc and axially spaced not only from said flange but also from said retaining plate,
   damper means arranged between said assembly and said flange of said hub for transmitting torque therebetween, said damper means comprising
   first damper means comprising a plurality of first damper coil springs each of which is wound around said annular wire guide and confined between a neighboring pair of one of said assembly blocks and one of said flange blocks in such a manner that each of said first springs is effective over the full angular range of the relative rotational displacement between said assembly and said flange, and
   second damper means comprising a plurality of second damper coil springs having a spring constant greater than that of said first springs, each of said second springs being contained in each of a plurality of pockets arranged circumfeentially around said hub, each of said pockets being formed by three openings which are formed, respectively, in said clutch plate, said flange, and said retaining plate in such a manner that said second springs begin to be compressed when a relative rotational displacement between said flange and said assembly exceeds a predetermined angle.

4. A clutch disc according to claim 3, wherein said first springs which abut on any one of said flange blocks on the side facing toward the direction in which the clutch disc normally rotates has a spring constant smaller than that of said first springs which abut on any one of said flange blocks on the opposite side.

* * * * *